United States Patent
Oroskar et al.

(10) Patent No.: US 10,869,248 B1
(45) Date of Patent: Dec. 15, 2020

(54) HANDOVER CONTROL BASED ON WCD LACKING SUPPORT FOR COMMUNICATION SCHEME

(71) Applicant: Sprint Spectrum L.P., Overland Park, KS (US)

(72) Inventors: Siddharth S. Oroskar, Overland Park, TX (US); Jasinder P. Singh, Olathe, TX (US)

(73) Assignee: Sprint Spectrum L.P., Overland Park, KS (US)

( * ) Notice: Subject to any disclaimer, the term of this patent is extended or adjusted under 35 U.S.C. 154(b) by 554 days.

(21) Appl. No.: 15/464,610

(22) Filed: Mar. 21, 2017

(51) Int. Cl.
*H04W 36/22* (2009.01)
*H04W 36/14* (2009.01)
*H04L 27/36* (2006.01)
*H04L 27/00* (2006.01)

(52) U.S. Cl.
CPC ......... *H04W 36/22* (2013.01); *H04L 27/0008* (2013.01); *H04W 36/14* (2013.01); *H04L 27/362* (2013.01)

(58) Field of Classification Search
None
See application file for complete search history.

(56) References Cited

U.S. PATENT DOCUMENTS

| | | | | |
|---|---|---|---|---|
| 6,542,742 B2* | 4/2003 | Schramm | ............... | H04W 36/30 370/332 |
| 6,668,159 B1* | 12/2003 | Olofsson | ................... | H04L 1/20 455/226.1 |
| 7,706,330 B2* | 4/2010 | Sartori | ................... | H04L 1/0028 370/333 |
| 8,223,721 B2* | 7/2012 | Berglund | .......... | H04W 36/0055 370/332 |
| 8,311,030 B2* | 11/2012 | Thakare | ................ | H04W 48/10 370/350 |
| 8,385,549 B2* | 2/2013 | Wang | .................... | H04W 12/04 380/270 |
| 8,767,571 B2* | 7/2014 | Faurie | ..................... | H04W 8/24 370/252 |
| 9,369,921 B2* | 6/2016 | Altman | ............. | H04W 28/0289 |
| 9,661,548 B2* | 5/2017 | Lim | ....................... | H04W 48/16 |
| 9,762,562 B2* | 9/2017 | Maguire | ................. | H04L 63/08 |
| 2011/0128862 A1* | 6/2011 | Kallin | ................... | H04W 36/22 370/245 |
| 2014/0023003 A1* | 1/2014 | De Pasquale | ....... | H04W 76/026 370/329 |
| 2015/0312788 A1* | 10/2015 | Delsol | ................... | H04W 24/10 370/252 |

* cited by examiner

*Primary Examiner* — Gregory B Sefcheck

(57) ABSTRACT

A method and system for controlling handover of a wireless communication device from a first base station to a second base station. Upon detecting a trigger (such as load) for handing over at least one WCD from the first base station, the first base station or another entity selects at least one of the WCDs served by the first base station based on a determination that the WCD is not configured to support use of a particular communication scheme, such as a particular modulation scheme, that the first base station is configured to support using for air interface communication. Based at least in part on that determination, the first base station then selects the WCD. And the first base station processes handover of the selected WCD from being served by the first base station to being served by the second base station.

20 Claims, 4 Drawing Sheets

HANDOVER CONTROL BASED ON WCD LACKING SUPPORT FOR COMMUNICATION SCHEME

BACKGROUND

A typical wireless communication system includes a number of base stations each operating to provide coverage in which to serve wireless communication devices (WCDs) such as cell phones, tablet computers, tracking devices, embedded wireless modules, and other wirelessly equipped devices, whether or not user operated. In turn, each base station may sit as a node on a core access network that includes entities such as a network controller, switches and/or gateways, and the core network may provide connectivity with one or more external transport networks such as the public switched telephone network (PSTN) and the Internet. With this arrangement, a WCD within coverage of the system may engage in air interface communication with a base station and may thereby communicate via the base station with various remote network entities or with other WCDs served by the base station.

Such a system may operate in accordance with a particular air interface protocol, examples of which include, without limitation, Long Term Evolution (LTE) (using orthogonal frequency division multiple access (OFDMA) and single-carrier frequency division multiple access (SC-FDMA)), Code Division Multiple Access (CDMA) (e.g., 1×RTT and 1×EV-DO), Global System for Mobile Communications (GSM), IEEE 802.11 (WIFI), and BLUETOOTH. Each protocol may define its own procedures for registration of WCDs, initiation of communications, handover between base station coverage areas, and other functions.

Further, each base station may provide wireless service to WCDs on one or more carrier frequencies, with the air interface defining various downlink and uplink channels. For instance, on the downlink, the air interface may define a reference channel for carrying a reference signal that WCDs can measure to evaluate base station coverage strength, the air interface may define various other downlink control channels for carrying control signaling to WCDs, and the air interface may define one or more downlink traffic channels for carrying bearer data (e.g., application-layer communications) and other information to WCDs. And on the uplink, the air interface may define an access channel for carrying WCD access requests to the base station, the air interface may define one or more other uplink control channels for carrying control signaling to the base station, and the air interface may define one or more uplink traffic channels for carrying bearer data and other information to the base station.

When a WCD initially enters into coverage of such a system, the WCD may scan for a strongest base station coverage area in which to operate, and the WCD may then engage in signaling with and via the base station, to register for service. The WCD may then be served by the base station in a connected state in which the WCD has an established radio-link-layer connection with the base station through which the WCD and base station may exchange bearer data, facilitating communication by the WCD on the external transport network for instance.

When so served, the WCD may from time to time also monitor coverage strength from its serving base station and from adjacent base stations, to help ensure that the WCD is served with sufficiently strong coverage and perhaps with the strongest available coverage. If the WCD's coverage from its serving base station becomes threshold weak and/or if another base station's coverage becomes threshold strong (e.g., threshold stronger than the serving base station's coverage or than a defined level), then the WCD may engage in signaling with its serving base station, and the serving base station may take action to coordinate handover of the WCD to the other base station.

Overview

Optimally, when WCDs are receiving sufficient coverage strength from their serving base station, the WCDs should be able to be served by that base station. However, there may also be some scenarios where, even though WCDs are receiving sufficiently strong coverage from their serving base station, it would be beneficial for the base station to hand over one or more of the WCDs to neighboring base stations. By way of example, this could happen if the base station becomes threshold highly loaded.

In practice, a base station may have limited resources. For instance, the various air interface control and traffic channels defined in the base station's coverage area could have limited capacity, such as a limited quantity of time and/or frequency resources, a limited quantity of spreading codes, or the like. Further, the base station might be limited to serving up to a maximum quantity of WCDs at a time, the base station's backhaul connection with a core network may have similarly limited capacity (e.g., in terms of supportable data rate or the like), and the base station may have limited processing resources.

Consequently, in operation, a base station may have a varying level of load, which could be defined in terms of an extent to which the base station's limited resources in use, possibly measured over a recent sliding window of time or the like. For instance, the base station's level of load could be based on a level of air interface resource utilization, a number of served WCDs, a level of backhaul utilization, and/or a level of processing load. Other examples are possible as well.

When a base station is threshold highly loaded, or in response to one or more other triggers possibly unrelated to strength of the base station's coverage as reported by its served WCDs, the base station may select one or more of its served WCDs to offload from being served by the base station so as to help free up capacity for the base station to serve other WCDs. To facilitate this, in response to the trigger, the base station may direct some or all of its served WCDs to scan for neighboring coverage and to report to the base station upon detecting such coverage of sufficient strength. And upon receipt of such a report from at least one WCD, the base station may then process handover of the WCD from the base station to the reported neighboring base station.

Given multiple served WCDs that could be subject to such handover, at issue in some cases may be which one or more WCDs the base station should select to be handed over. The issue here could be which WCD(s) the base station should direct to scan for neighboring coverage in an effort to determine which WCD to hand over. Or the issue could be, of multiple WCDs that scan for and report sufficient neighboring coverage, which WCD the base station should select to be handed over.

In accordance with the present disclosure, the base station could base this WCD selection on a consideration of the whether the WCD is capable of supporting a particular communication scheme, such as a particular modulation scheme for air interface communication with the base station. Specifically, the base station's selection of a WCD to hand over could be based at least in part on a determination that the WCD does not support use of a particular communication scheme, such as a particular modulation scheme, that the base station supports using. Given that such a WCD would not benefit from the base station's support for use of the communication scheme (since the WCD itself does not support use of the communication scheme), the WCD would not suffer a loss with respect to that communication scheme if the WCD is handed over from the base station to another base station, which might not support use of the communication scheme. Whereas, other WCDs that support use of the communication scheme may be able to benefit from the base station's support for use of the communication scheme. Therefore, selecting a WCD for handover based at least in part on the WCD not supporting the communication scheme could help to better manage use of the base station's resources.

Accordingly, disclosed herein is a method for controlling WCD handover from a first base station to a second base station, where each base station is configured to serve WCDs and where each WCD has a respective defined set of capabilities. According to the method, the first base station could select, from among multiple WCDs currently served by the first base station, a WCD to be handed over from being served by the first base station to being served by the second base station, with the selecting of the WCD to be handed over being based on a determination that the WCD's defined set of capabilities does not include support for use of a particular communication scheme that the first base station is configured to support using for air interface communication. In turn, the method then involves the first base station processing handover of the selected WCD from being served by the first base station to being served by the second base station.

Further, in another respect, disclosed is a method for controlling handover in a wireless communication system, where the system includes a plurality of base stations each configured to serve WCDs, and where each WCD has a respective defined set of capabilities. As disclosed, the method includes detecting that a first base station is threshold highly loaded. And the method includes, responsive to at least the detecting that the first base station is threshold highly loaded, (a) selecting, from among a plurality of WCDs currently served by the first base station, a WCD to be handed over from being served by the first base station to being served by a second base station, where the selecting includes (i) determining that the WCD is also within coverage of the second base station and that the WCD's defined set of capabilities does not include support for use of a particular modulation scheme and (ii) responsive to at least the determining, selecting the WCD, and (b) processing handover of the selected WCD from being served by the first base station to being served by the second base station.

Still further, in yet another respect, disclosed is a first base station in a wireless communication system that comprises a plurality of base stations each configured to serve WCDs, where each WCD has a respective defined set of capabilities. As disclosed, the first base station includes a wireless communication interface having one or more antennas, configured to transmit and receive. Further, the first base station includes a network communication interface through which the base station is configured to engage in communication with other base stations. And the base station includes a controller comprising one or more processing units, non-transitory data storage, and program instructions stored in the data storage and executable by the one or more processing units to carry out various operations.

For instance, the operations could include detecting that the first base station is threshold highly loaded. Further, the operations could include, responsive to at least the detecting that the first base station is threshold highly loaded, (a) selecting, from among a plurality of WCDs currently served by the first base station, a WCD to be handed over from being served by the first base station to being served by a second base station, where the selecting includes (i) determining that the WCD is also within coverage of the second base station and that the WCD's defined set of capabilities does not include support for use of a particular modulation scheme that the first base station supports using and (ii) responsive to at least the determining, selecting the WCD, and (b) processing handover of the selected WCD from being served by the first base station to being served by the second base station.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

This description will discuss implementation by way of example in the context of an LTE network. It will be understood, however, that principles of the disclosure can extend to apply in other scenarios as well, such as with respect to other radio access protocols. Further, even within the context of LTE, variations from the details disclosed may be possible. For instance, elements, arrangements, and operations may be added, removed, combined, distributed, or otherwise modified. In addition, it will be understood that operations described as being performed by one or more entities may be implemented in various ways, such as by one or more processing units executing program instructions for instance.

Figure 1:
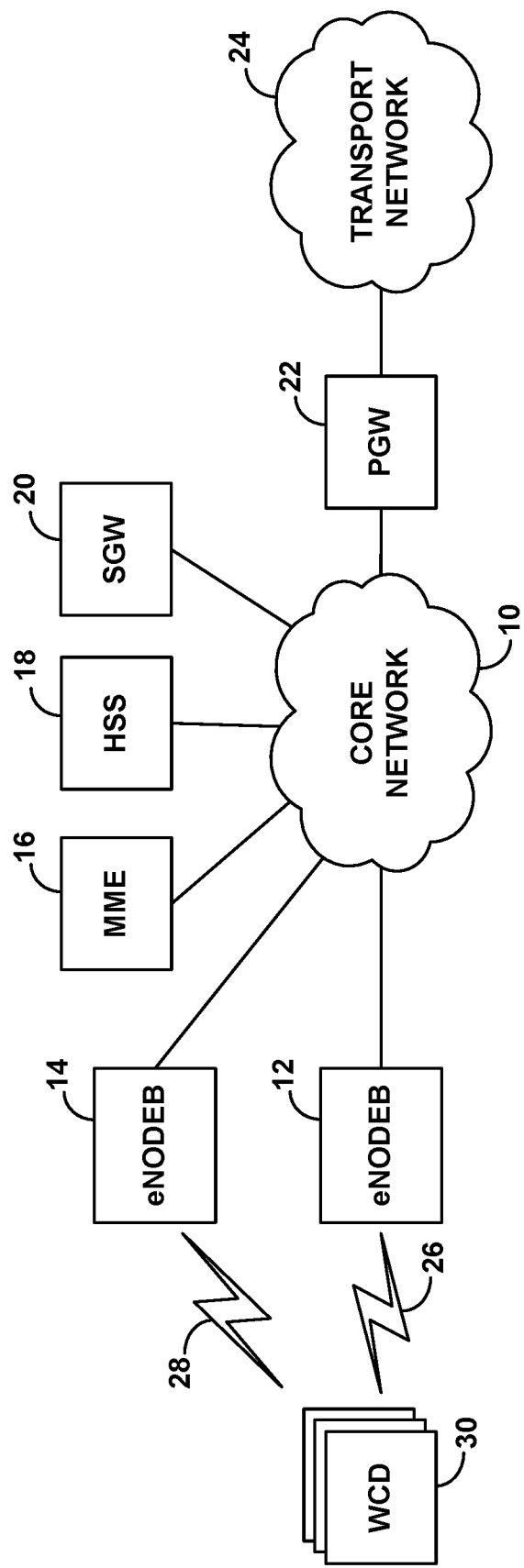
FIG. 1 is a simplified block diagram of an example wireless communication system in which features of the present disclosure can be implemented.

Referring to the drawings, as noted above, FIG. 1 is a simplified block diagram of a wireless communication system in which features of the present disclosure can be implemented. In particular, FIG. 1 depicts an example LTE network, which functions primarily to serve WCDs with wireless packet data communication service, including possibly voice-over-packet service, but may also provide other functions. The LTE network may be implemented by a wireless service provider. As shown, the LTE network includes a core network 10 (or "evolved packet core (EPC)") could be a packet-switched network, compliant with the industry standard system architecture evolution (SAE) for the LTE protocol, and thus the entities shown on the core network could each have an IP address and be configured to communicate with each other over packet-based tunnels or other communication interfaces.

Shown sitting on the core network 10 are, by way of example, two LTE base stations 12, 14, referred to as evolved-Node-B's (eNodeBs), as well as a mobility management entity (MME) 16, a home subscriber server (HSS) 18, a serving gateway (SGW) 20, and a packet data network (PDN) gateway (PGW) 22, with the PGW then providing connectivity with a packet-switched transport network 24 such as the Internet. With this arrangement, each eNodeB could have communication interfaces with the MME 16 and the SGW 20 and could be configured to communicate with the MME and the SGW over those interfaces, and the SGW could have communication interfaces with the PGW and could be configured to communicate with the PGW over those interfaces. Further, the eNodeBs could have communication interfaces (e.g., X2 interfaces) with each other and could be configured to communicate with each other over those interfaces.

In practice, each of the eNodeBs 12, 14 is configured to provide a respective coverage area 26, 28, such as a respective cell or sector, in which the eNodeB can serve WCDs. As such, each eNodeB could take various forms. For instance, an eNodeB could be a macro eNodeB of the type typically including a tower-mounted antenna structure and providing a broad of coverage. Or an eNodeB could be a small-cell eNodeB or the like (e.g., a femtocell, relay, etc.) of the type typically having a smaller form factor and providing a narrower range of coverage.

Under LTE, each eNodeB's coverage area defines an air interface on a respective carrier, which could be frequency division duplex (FDD), in which separate ranges of frequency are provided for downlink and uplink communication, or time division duplex (TDD), in which a single range of frequency is multiplexed over time between downlink and uplink communication. Such a carrier would have a frequency bandwidth (e.g., 1.4 MHz, 3 MHz, 5 MHz, 10 MHz, 15 MHz, or 20 MHz). Further, the air interface is divided over time into a continuum of 10-millisecond frames each divided into ten 1-millisecond subframes. And in each subframe, the air interface is divided over time into fourteen symbol time segments of 0.67 microseconds, and the carrier bandwidth is divided into 15 kHz subcarriers.

With this arrangement, the LTE air interface thus defines in each subframe an array of resource elements, each 15 kHz by 0.67 microseconds. Further, certain of these resource elements are reserved to define particular channels such as those noted above.

For instance, on the downlink, resource elements in the first one, two, or three symbol time segments per subframe are generally reserved to define a control region for carrying control signaling from the eNodeB to WCDs, and remaining resource elements are generally reserved to define a shared channel region in which the eNodeB can schedule data communications to particular WCDs. Further, certain resource per frame are reserved to define synchronization channels that carry signaling to enable time synchronization and that indicate a physical cell identifier (PCI) of the coverage area. And certain resource elements per subframe are reserved to carry a reference signal that WCDs can measure to evaluate coverage strength.

Likewise, on the uplink, certain resource elements per subframe (namely, those at the low end and high end of the carrier bandwidth) are generally reserved to define a control region for carrying control signaling from WCDs to the eNodeB, and remaining resource elements are generally reserved to define a shared channel in which the eNodeB can schedule data communications from particular WCDs. Further, certain resource elements per subframe are reserved for other purposes, such as to define a random access channel for carrying access signaling from WCDs, and to define uplink reference signals for carrying WCD reference signals that the eNodeB could measure to help establish timing of WCD communications.

When such a WCD first powers on or enters into coverage of the network, the WCD may search for the strongest coverage it can find and, as noted above, may engage in a signaling process to register for service with the eNodeB providing that coverage. In practice, for instance, the WCD may engage in random access signaling with the eNodeB and may then work with the eNodeB to establish a logical Radio Resource Configuration (RRC) connection between the WCD and the eNodeB. The WCD may then engage in attach signaling with the eNodeB and MME, and the MME and HSS may engage in authentication of the WCD. Further, the MME may engage in further signaling with the eNodeB and with the SGW, and the SGW may engage in associated signaling with the PGW, to establish for the WCD one or more bearers for carrying packet data between the WCD and the PGW, to enable the WCD to engage in communication on transport network 24.

Once the WCD has an established RRC connection with an eNodeB, the eNodeB may then serve the WCD with data communications over the air interface defined by the eNodeB's coverage area. For instance, when packet data arrives on the transport network 24 for the WCD, the data may flow from the PGW to the SGW and in turn to the eNodeB, and the eNodeB may then schedule transmission of that data on air interface resources of the downlink shared channel, transmit a control message to the WCD indicating the scheduled resources, and transmit the data to the WCD accordingly. And when the WCD has packet data to transmit on network 24, the WCD may send a scheduling request to the eNodeB, the eNodeB may then schedule transmission of that data on air interface resources of the uplink shared channel and transmit a control message to the WCD indicating the scheduled resources, the WCD may transmit the data to the eNodeB accordingly, and the data may flow from the eNodeB to the SGW and in turn to the PGW for transmission on network 24.

When a WCD is being served by an eNodeB, the WCD may regularly evaluate quality of its air interface connection with the eNodeB and provide the eNodeB with a channel quality report. In particular, based on strength of the eNodeB's reference signal and other factors, the WCD may derive a channel quality indicator (CQI) and transmit the CQI to the eNodeB.

When the eNodeB schedules data communication over the air to or from the WCD, the eNodeB may then use the WCD's latest CQI report as a basis to control that data communication. For instance, applying a standard mapping table, the eNodeB could map the WCD's latest reported CQI to a modulation and coding scheme (MCS) to be used for the data transmission. The MCS defines how much forward-error-correction information should be transmitted along with the data, thus establishing an effective rate for transmission of the data. And the MCS further defines a modulation scheme, which establishes how many bits will be represented by each air interface resource element. Once the eNodeB decides what MCS to use for air interface communication with a WCD, the eNodeB may indicate the MCS in control signaling to the WCD, and the eNodeB and WCD may then engage in air interface communication accordingly using that MCS.

Example modulation schemes include, without limitation, quadrature phase-shift keying (QPSK), in which each resource element represents 2 bits, 8 phase-shift keying (8PSK), in which each resource element represents 3 bits, 16 quadrature amplitude modulation (16QAM), in which each resource element represents 4 bits, 32QAM, in which each resource element represents 5 bits, 64QAM, in which each resource element represents 6 bits, and 256QAM, in which each resource element represents 8 bits.

At a given coding rate, a higher-order modulation scheme such as 64QAM or 256QAM should provide faster data transmission than a lower-order modulation scheme such as 8PSK or 16QAM, because the higher-order modulation scheme would allow transmission of a greater quantity of data within a given number of air interface resource elements. However, air interface communication at a higher order modulation scheme also takes more refined radio equipment or the like at both the eNodeB and the WCD. And as it is, depending on radio equipment or other characteristics or settings, certain eNodeBs and certain UEs may be configured to support use of particular modulation schemes, whereas other eNodeBs and UEs may not be configured to support use of such modulation schemes. Further, this support issue could be for uplink communication, downlink communication, or both.

For instance, an eNodeB may or may not be configured to support using 256QAM for air interface communication. If the eNodeB is configured to support using 256QAM, then the eNodeB might be set to apply a CQI-to-MCS mapping table that maps CQIs to MCS ranging from, say, QPSK up to 256QAM, with 256QAM being used when possible for a WCD in the best channel conditions. Whereas, if the eNodeB is not configured to support using 256QAM, then the eNodeB might be configured to instead apply a CQI-to-MCS mapping table that maps CQIs to MCSs ranging from, say, QPSK up to 64QAM, with 64QAM being used when possible for a WCD in the best channel conditions. Other examples are possible as well.

Further, the eNodeB could take into account a served WCD's support for particular modulation schemes when deciding what MCS should be used for air interface communication between the eNodeB and the WCD. For instance, if the eNodeB supports up to 64QAM and the WCD supports up to 64QAM, and if the WCD reports the best channel conditions, then the eNodeB may direct use of 64QAM for air interface communication with the WCD. Whereas, if the eNodeB supports up to 64QAM but the WCD only supports only up to 16QAM, and if the WCD reports the best channel conditions, then the eNodeB may direct use of just 16QAM for air interface communication with the WCD.

In practice, the eNodeB may learn a WCD's capabilities, such as what modulation schemes or other communication schemes the WCD supports, at the time of WCD attachment or at another time.

By way of example, at or near the end of the WCD attachment process and/or at other times, the WCD may transmit to the eNodeB and/or MME a WCD-capabilities report indicating various capabilities of the WCD. In particular, the WCD-capabilities report could include a feature group indicator (FGI) bit string in which each bit is a Boolean indication of whether or not the WCD supports a particular corresponding feature. Some such bits could correspond with particular modulation schemes, such as 64QAM or 256QAM, or with other communication schemes (e.g., support for particular signaling protocols or the like). For instance, an FGI bit could indicate expressly that the WCD does or does not support use of a particular communication scheme. Or an FGI bit could indicate whether a WCD supports use of a particular communication scheme by indicating a class of features (e.g., a device category) that includes that communication scheme.

And as another example, the eNodeB may learn a WCD's capabilities through signaling from the MME or another network entity. For instance, during the attachment process or later, the MME may obtain from the HSS a service profile record for the WCD that includes indications of WCD capabilities such as those noted above, and the MME may forward that capability information to the eNodeB for later reference by the eNodeB. Other examples are possible as well.

In operation, an eNodeB may also regularly monitor its level of load, which as noted above could take various forms. By way of example, the eNodeB could regularly monitor how many WCDs it is serving, such as how many WCDs have an RRC connection with the eNodeB, perhaps as a percentage of an allowed maximum number of concurrently served WCDs. As another example, the eNodeB could regularly monitor its air interface resource utilization, such as what percentage of control region resource elements and/or shared channel resource elements have been used on average over a recent sliding window of time. As still another example, the eNodeB could regularly monitor its backhaul utilization (backhaul load), such as how much data the eNodeB has communicated to and/or from the core network 10 on average over a recent sliding window. And as still another example, the eNodeB could regularly monitor its processing load, such as how many central processing unit (CPU) cycles the eNodeB has used on average over a recent sliding window. The eNodeB could consider these and/or other load metrics alone or in combination.

Further, an eNodeB could exchange load information with neighboring eNodeBs, to facilitate possible load-based handover of WCDs. For example, eNodeBs 12 and 14 shown in FIG. 1 could periodically report to each other over an inter-base station interface (e.g., X2 interface) their respective levels of load. That way, if eNodeB 12 becomes heavily loaded and neighboring eNodeB 14 is just lightly loaded, eNodeB 12 could responsively consider processing handover of one or more of its served WCDs 30 to the eNodeB 14 to help balance load between the eNodeBs.

In line with the discussion above, when eNodeB 12 detects that it is threshold heavily loaded (e.g., that one or more of the above noted load metrics is at least as high as a predefined threshold level), eNodeB 12 could initiate a process to offload one or more of its served WCDs 30.

For instance, eNodeB 12 could first transmit to each of its served WCDs 30 a control signal that directs each such WCD to scan for neighboring coverage of sufficient strength and to report to eNodeB 12 upon detecting such coverage. Namely, eNodeB 12 could direct each such WCD to report to eNodeB 12 upon detecting occurrence of an "A4" measurement event, which is when neighboring coverage is sufficiently high. Upon receipt of such reports from any of served WCDs 30, eNodeB could then select one or more of the reporting WCDs to hand over to the detected neighboring eNodeB. For instance, if some of WCDs 30 report detecting sufficiently strong coverage from eNodeB 14, then eNodeB 12 could select one or more of those reporting WCDs to hand over to eNodeB.

Having selected one or more WCDs to hand over to eNodeB 14, eNodeB 12 could then process handover of each such WCD accordingly. For instance, eNodeB 12 could transmit via an inter-base-station interface to eNodeB 14 a handover request message to prepare eNodeB 14 to receive handover of the WCD. And upon receipt of a response from eNodeB 14, eNodeB 12 could signal over the air to the WCD to cause the WCD to transition from being served by eNodeB 12 to being served by eNodeB 14. Further, the eNodeBs could also engage in signaling with the MME and SGW to arrange for transfer of any bearer connections accordingly.

Further in line with the discussion above, eNodeB 12 could advantageously base its selection of one or more WCDs to offload on a determination that each such WCD does not support a particular communication scheme, such as a particular modulation scheme. And particularly, eNodeB 12 could base its selection of each such WCD on a determination that the WCD does not support a particular communication scheme that eNodeB 12 does support using for air interface communication. For example, when selecting a WCD to hand over, the eNodeB could base its selection on the WCD not supporting 64QAM, and perhaps on a determination that the eNodeB supports use of 64QAM but the WCD does not support use of 64QAM. And with this example, the eNodeB could further base its selection of the WCD on a determination that the eNodeB 14 to which the WCD would be handed over also does not support use of that communication scheme.

As noted above, consideration of the WCD's lack of support for the particular communication scheme could be a basis for the eNodeB to direct the WCD to scan for neighboring coverage, so as to determine if the WCD is in sufficiently strong neighboring coverage and to thereby facilitate possible handover of the WCD to that neighboring coverage. Alternatively, faced with multiple WCDs reporting that they are within sufficiently strong neighboring coverage to justify handover, consideration of the WCD's lack of support for the particular communication scheme could be a basis for the eNodeB to select, from among the multiple WCDs, one or more WCDs to hand over.

In practice, the eNodeB could review WCD capability data of the type noted above to determine whether a WCD supports use of a particular communication scheme, such as a particular modulation scheme. Thus, by reference to that capabilities data, the eNodeB could determine that the WCD does not support use of a particular communication scheme, such as one that eNodeB itself does support using. And in selecting a WCD to hand over to another eNodeB, the eNodeB base its selection on the determination that the WCD does not support use of that communication scheme, which could be advantageous as discussed above.

Figure 2:
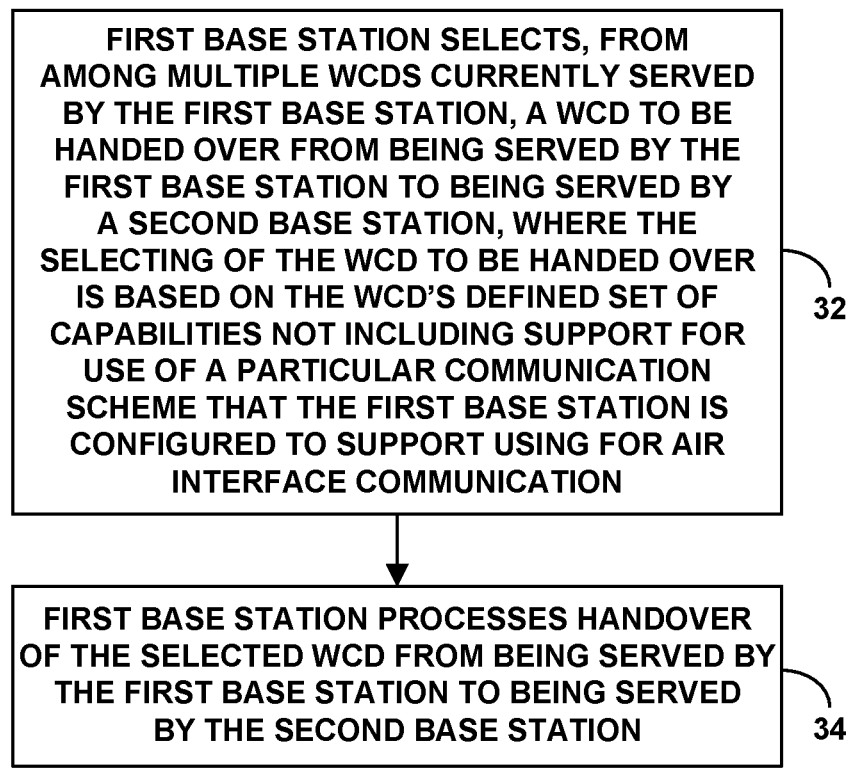
FIG. 2 is a flow chart depicting operations that can be carried out in accordance with the disclosure.

FIG. 2 is next a flow chart depicting operations that could be carried out in line with the discussion above, to control WCD handover from a first base station to a second base station, where each base station is configured to serve WCDs, and where each WCD has a respective defined set of capabilities (e.g., as described above). As shown in FIG. 2, at block 32, the first base station selects, from among multiple WCDs currently served by the first base station, a WCD to be handed over from being served by the first base station to being served by the second base station, where the selecting of the WCD to be handed over is based on the WCD's defined set of capabilities not including support for use of a particular communication scheme that the first base station is configured to support using for air interface communication. And at block 34, the first base station then processes handover of the selected WCD from being served by the first base station to being served by the second base station.

As discussed above, the selecting of the WCD for handover and the processing of handover of the WCD in this scenario could be further based on other factors, such as (i) the WCD being within coverage of the second base station, (ii) a load level of the second base station, and/or (iii) the second base station not supporting the communication scheme at issue.

For instance, the first base station could receive a measurement report from the WCD indicating that it is within threshold strong coverage of the second base station. And the first base station could receive from the second base station a report indicating that the second base station is not threshold heavily loaded and could determine (perhaps from neighbor-list data or through signaling with the second base station or the MME) that the second base station does not support use of the particular communication scheme. And the first base station could then base its selection of the WCD on the WCD being within threshold strong coverage of the second base station, the second base station not being threshold heavily loaded, the WCD not supporting use of the particular communication scheme, and the second base station not supporting use of the particular communication scheme.

Further, as noted above, the particular communication scheme at issue could be a particular data modulation scheme, such as 64QAM or 256QAM for instance. And as noted above, the method could further involve the first base station receiving (e.g., from the WCD or from a network controller such as the MME) capabilities data for the WCD, in which case the act of selecting of the WCD based on the WCD's defined set of capabilities not including support for use of a particular communication scheme that the first base station is configured to support using could involve referring to the capabilities data to determine whether the WCD's defined set of capabilities does not include support for use of the particular communication scheme that the first base station is configured to support using.

Figure 3:
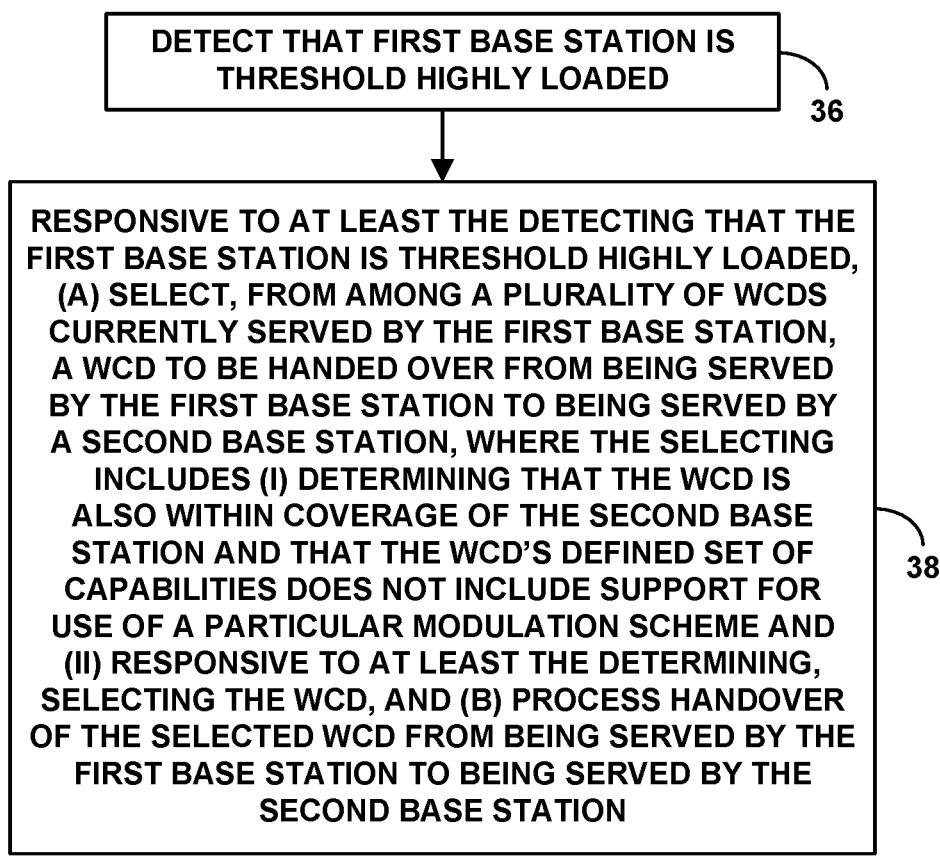
FIG. 3 is another flow chart depicting operations that can be carried out in accordance with the disclosure.

FIG. 3 is next another flow chart depicting a method that could be carried out in accordance with the discussion above, to control handover in a wireless communication system, where the system includes multiple base stations each configured to serve WCDs, where each WCD has a respective defined set of capabilities. This method could be carried out by a base station such as eNodeB 12 and/or by one or more other network entities, possibly operating with or on behalf of the eNodeB 12.

As shown in FIG. 3, at block 36, the method includes detecting that the first base station is threshold highly loaded. And at block 38, the method includes, responsive to at least the detecting that the first base station is threshold highly loaded, (a) selecting, from among a plurality of WCDs currently served by the first base station, a WCD to be handed over from being served by the first base station to being served by a second base station, wherein the selecting includes (i) determining that the WCD is also within coverage of the second base station and that the WCD's defined set of capabilities does not include support for use of a particular modulation scheme and (ii) responsive to at least the determining, selecting the WCD, and (b) processing handover of the selected WCD from being served by the first base station to being served by the second base station.

As discussed above, the act of detecting that the first base station is threshold highly loaded could involve detecting that the first base station has threshold high load considering one or more load metrics such as air interface resource utilization, quantity of served WCDs, backhaul utilization, and processor load. The first base station could detect this threshold high load and/or another entity (perhaps one to which the first base station reports its load, or one that can otherwise monitor and/or track base station load) could detect this threshold high load and possibly signal accordingly.

Further, as discussed above, the act of determining that the WCD is also within coverage of the second base station could involve receiving from the WCD a measurement report reporting that the WCD has detected coverage of the second base station. And the act of determining that the WCD's defined set of capabilities does not include support for use of the particular modulation scheme could involve referring to WCD capabilities data to determine that the WCD does not support use of the particular modulation scheme.

In addition, as also discussed above, the first base station could support use of the particular modulation scheme, and the act of determining that the WCD's defined set of capabilities does not include support for use of the particular modulation scheme could involve determining that the WCD's defined set of capabilities does not include support for use of the particular modulation scheme that the first base station supports using. Further, as discussed above, the particular modulation scheme could be one of those noted above by way of example, such as 64QAM or 256QAM for instance.

Figure 4:
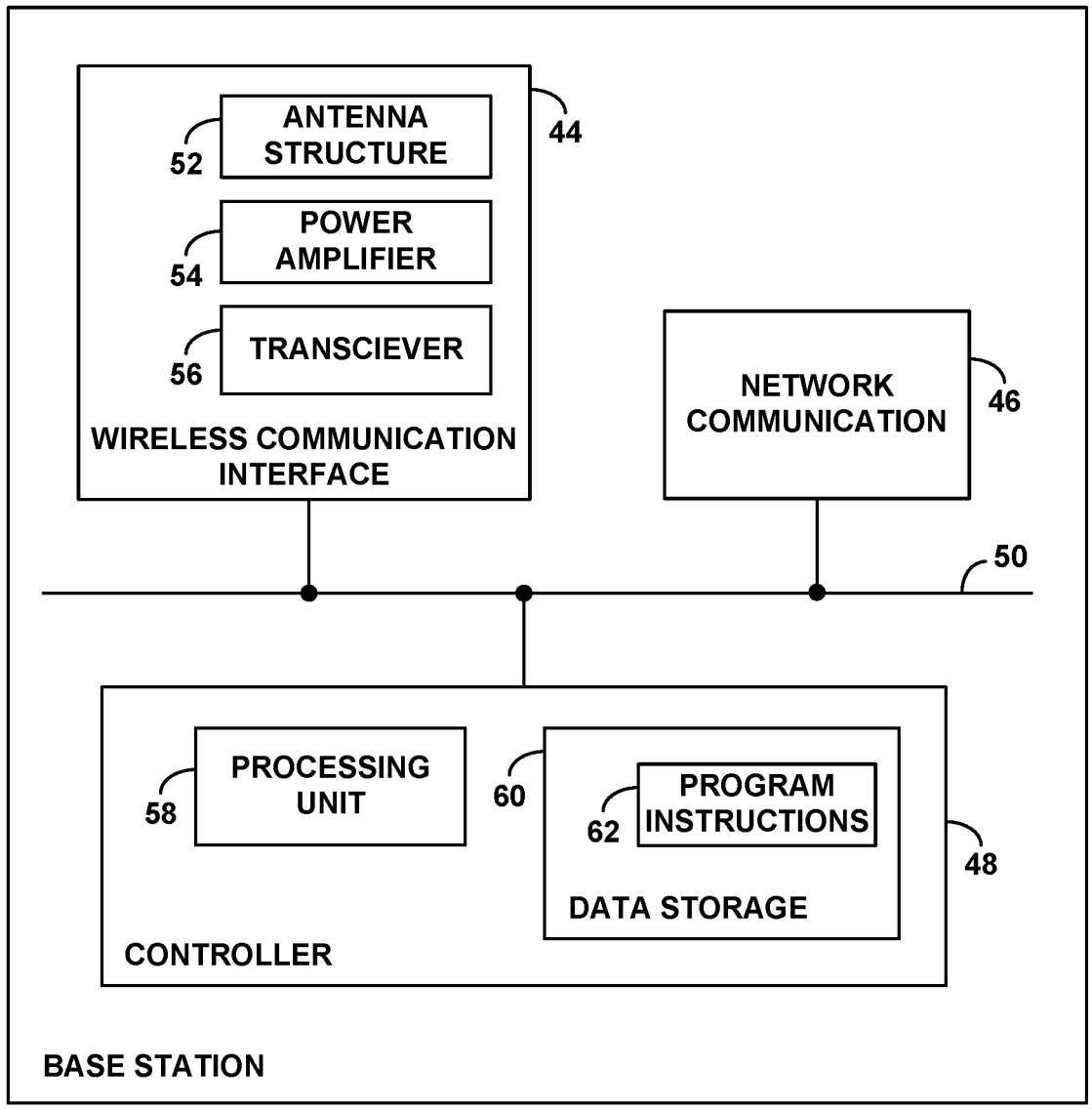
FIG. 4 is a simplified block diagram of a base station operable in the disclosed system.

Finally, FIG. 4 is a simplified block diagram of an example base station, showing some of the components that each of the base stations in FIG. 1 could include in an example implementation. As shown in FIG. 4, the base station includes a wireless communication interface 44, a network communication interface 46, and a controller 48. These components are shown communicatively linked together by a system bus or other communication link 50, but it will be understood that the components could alternatively be integrated together or distributed in various ways. For instance, aspects of the controller 48 could be provided in a chipset that implements functions of the wireless communication interface 44. Other examples are possible as well.

As shown, wireless communication interface 44 could include an antenna structure (e.g., one or more antennas) 52, which, together with a power amplifier 54 and a transceiver 56, facilitates air interface communication (transmitting and receiving), so that the base station can serve one or more WCDs via the wireless communication interface. In practice, the wireless communication interface could be configured, by including suitably equipped hardware, software, and/or configuration settings, to support using a particular modulation scheme for air interface communication. For instance, the wireless communication interface could be configured to support 64QAM and/or 256QAM, among other modulation schemes.

Network communication interface 46 could then include a wired or wireless network interface, such as an Ethernet interface, through which the base station could communicate with other entities via a core network or the like.

And controller 48 could include a processing unit (one or more processors) 58, non-transitory data storage 60, and program instructions 62 stored in the non-transitory data storage and executable by the processing unit to carry out various operations described herein.

For instance, the controller could be thus configured to cause the base station to detect that it is threshold highly loaded, such as by monitoring and detecting at least as high as a predefined threshold high level of load considering metrics such as air interface resource utilization, quantity of served WCDs, backhaul utilization, processor load, or the like. Further, the controller could be configured to cause the base station to respond to at least the detecting that the base station is threshold highly loaded by (a) selecting, from among a plurality of WCDs currently served by the base station, a WCD to be handed over from being served by the base station to being served by another base station and (b) processing handover of the selected WCD from being served by the base station to being served by the other base station.

In line with the discussion above, the act of selecting the WCD to be handed over from being served by the base station to being served by the other base station could be based on at least the WCD being within coverage of the other base station and the WCD not being configured to support the particular modulation scheme that the base station supports. For instance, the base station could receive from the WCD a measurement report reporting that the WCD has detected coverage of other base station. And the base station could determine from the WCD's capability data that the WCD's defined set of capabilities does not include support for use of the particular modulation scheme that the base station supports using for air interface communication. Responsive to at least the WCD being within coverage of the other base station and not supporting use of the particular modulation scheme, the base station could then select the WCD to be handed over to the other base station.

Exemplary embodiments have been described above. Those skilled in the art will understand, however, that changes and modifications may be made to these embodiments without departing from the true scope and spirit of the invention.

We claim:

1. A method for controlling wireless communication device (WCD) handover from a first base station to a second base station, wherein each base station is configured to serve wireless communication devices (WCDs), wherein each WCD has a respective defined set of capabilities, the method comprising:
   selecting by the first base station, from among multiple WCDs currently served by the first base station, a WCD to be handed over from being served by the first base station to being served by the second base station, wherein the selecting of the WCD to be handed over is based on the WCD's defined set of capabilities not including support for use of a particular communication scheme that the first base station is configured to support using for air interface communication; and
   processing by the first base station handover of the selected WCD from being served by the first base station to being served by the second base station.

2. The method of claim 1, wherein at least the processing handover of the selected WCD from being served by the first base station to being served by the second base station base station is further based on the WCD being within coverage of the second base station.

3. The method of claim 1, wherein at least the processing handover of the WCD from being served by the first base station to being served by the second base station is further based on load of the first base station and load of the second base station,
   wherein the load of the first base station and the load of the second base station each comprise a metric selected from the group consisting of air interface resource utilization, quantity of served WCDs, backhaul utilization, and processor load.

4. The method of claim 1, wherein at least the selecting and processing of handover are additionally based on the second base station not supporting the communication scheme.

5. The method of claim 1, wherein the communication scheme comprises a data modulation scheme.

6. The method of claim 5, wherein the data modulation scheme is selected from the group consisting of (i) 64 quadrature amplitude modulation and (ii) 256 quadrature amplitude modulation.

7. The method of claim 1, further comprising receiving by the first base station capabilities data for the WCD, wherein selecting of the WCD based on the WCD's defined set of capabilities not including support for use of a particular communication scheme that the first base station is configured to support using comprises:
referring to the capabilities data to determine whether the WCD's defined set of capabilities does not include support for use of the particular communication scheme that the first base station is configured to support using.

8. The method of claim 7, wherein receiving the capabilities data for the WCD comprises receiving the capabilities data from a source selected from the group consisting of (i) the WCD and (ii) a network controller.

9. A method for controlling handover in a wireless communication system, wherein the wireless communication system comprises a plurality of base stations each configured to serve wireless communication devices (WCDs), wherein each WCD has a respective defined set of capabilities, the method comprising:
detecting that a first base station is threshold highly loaded; and
responsive to at least the detecting that the first base station is threshold highly loaded, (a) selecting, from among a plurality of WCDs currently served by the first base station, a WCD to be handed over from being served by the first base station to being served by a second base station, wherein the selecting includes (i) determining that the WCD is also within coverage of the second base station and that the WCD's defined set of capabilities does not include support for use of a particular modulation scheme and (ii) responsive to at least the determining, selecting the WCD, and (b) processing handover of the selected WCD from being served by the first base station to being served by the second base station.

10. The method of claim 9, wherein detecting that the first base station is threshold highly loaded comprises detecting that the first base station has threshold high load comprising load selected from the group consisting of air interface resource utilization, quantity of served WCDs, backhaul utilization, and processor load.

11. The method of claim 9, carried out by the first base station.

12. The method of claim 9, wherein determining that the WCD is also within coverage of the second base station comprises receiving from the WCD a measurement report reporting that the WCD has detected coverage of the second base station.

13. The method of claim 9, wherein determining that the WCD's defined set of capabilities does not include support for use of the particular modulation scheme comprises referring to WCD capabilities data to determine that the WCD does not support use of the particular modulation scheme.

14. The method of claim 9, wherein the first base station supports use of the particular modulation scheme, and wherein determining that the WCD's defined set of capabilities does not include support for use of the particular modulation scheme comprises determining that the WCD's defined set of capabilities does not include support for use of the particular modulation scheme that the first base station supports using.

15. The method of claim 9, wherein the particular modulation scheme is a scheme selected from the group consisting of (i) 64 quadrature amplitude modulation and (ii) 256 quadrature amplitude modulation.

16. In a wireless communication system comprising a plurality of base stations each configured to serve wireless communication devices (WCDs), wherein each WCD has a respective defined set of capabilities, a first base station comprising:
a wireless communication interface including one or more antennas, configured to transmit and receive;
a network communication interface through which the base station is configured to engage in communication with other base stations; and
a controller including one or more processing units, non-transitory data storage, and program instructions stored in the data storage and executable by the one or more processing units to carry out operations including:
detecting that the first base station is threshold highly loaded, and
responsive to at least the detecting that the first base station is threshold highly loaded, (a) selecting, from among a plurality of WCDs currently served by the first base station, a WCD to be handed over from being served by the first base station to being served by a second base station, wherein the selecting includes (i) determining that the WCD is also within coverage of the second base station and that the WCD's defined set of capabilities does not include support for use of a particular modulation scheme that the first base station supports using and (ii) responsive to at least the determining, selecting the WCD, and (b) processing handover of the selected WCD from being served by the first base station to being served by the second base station.

17. The first base station of claim 16, wherein detecting that the first base station is threshold highly loaded comprises detecting that the first base station has threshold high load comprising load selected from the group consisting of air interface resource utilization, quantity of served WCDs, backhaul utilization, and processor load.

18. The first base station of claim 16, wherein determining that the WCD is also within coverage of the second base station comprises receiving from the WCD a measurement report reporting that the WCD has detected coverage of the second base station.

19. The first base station of claim 16, wherein determining that the WCD's defined set of capabilities does not include support for use of the particular modulation scheme comprises referring to WCD capabilities data to determine that the WCD's defined set of capabilities does not include support for use of the particular modulation scheme.

20. The first base station of claim 16, wherein the particular modulation scheme is a scheme selected from the group consisting of (i) 64 quadrature amplitude modulation and (ii) 256 quadrature amplitude modulation.

* * * * *